United States Patent
Chou et al.

(10) Patent No.: US 10,923,809 B2
(45) Date of Patent: Feb. 16, 2021

(54) COMMUNICATION APPARATUS, ELECTRONIC APPARATUS AND ANTENNA ADJUSTMENT METHOD

(71) Applicants: Liang-Che Chou, Taipei (TW); Li-Chun Lee, Taipei (TW); Yu-Chun Hsieh, Taipei (TW); Mau-Chi Sun, Taipei (TW); Jui-Hung Lai, Taipei (TW); Wen-Feng Tsai, Taipei (TW); Chih-Chien Liu, Taipei (TW)

(72) Inventors: Liang-Che Chou, Taipei (TW); Li-Chun Lee, Taipei (TW); Yu-Chun Hsieh, Taipei (TW); Mau-Chi Sun, Taipei (TW); Jui-Hung Lai, Taipei (TW); Wen-Feng Tsai, Taipei (TW); Chih-Chien Liu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/372,412

(22) Filed: Apr. 2, 2019

(65) Prior Publication Data
US 2019/0305414 A1     Oct. 3, 2019

Related U.S. Application Data

(60) Provisional application No. 62/651,693, filed on Apr. 2, 2018, provisional application No. 62/768,098, filed on Nov. 16, 2018.

(51) Int. Cl.
*H01Q 1/52* (2006.01)
*H04B 1/18* (2006.01)
*H01Q 1/24* (2006.01)

(52) U.S. Cl.
CPC ............. *H01Q 1/521* (2013.01); *H01Q 1/24* (2013.01); *H04B 1/18* (2013.01)

(58) Field of Classification Search
CPC ............. H01Q 1/24; H01Q 1/521; H04B 1/18
(Continued)

(56) References Cited

U.S. PATENT DOCUMENTS

| 7,937,052 B2* | 5/2011 | Banh ............... H04B 7/0868 455/140 |
| 2005/0113048 A1* | 5/2005 | Miyahara ............. H04B 7/0874 455/137 |
| 2012/0058740 A1* | 3/2012 | Nakata ............... H04B 1/26 455/257 |

FOREIGN PATENT DOCUMENTS

JP   2013247503   * 12/2013   ............... H01Q 3/24

OTHER PUBLICATIONS

Translation of JP-2013247503. (Year: 2013).*

* cited by examiner

*Primary Examiner* — Lee Nguyen
(74) *Attorney, Agent, or Firm* — JCIPRNET

(57) ABSTRACT

A communication apparatus, an electronic apparatus and an antenna adjustment method thereof are provided. The communication apparatus includes an antenna system, a tuning portion and a switch circuit. The antenna system includes at least two antenna units. The tuning portion is disposed between the at least two antenna units and includes at least two branch units. The switch circuit is coupled to the tuning portion. The switch circuit switches a conduction from a first one of the branch units to a second one of the branch units according to a switching signal. The switching signal is related to performances of the antenna system. Accordingly, a dynamic and flexible adjustment mechanism can be provided to increase throughput and improve users' internet experience.

19 Claims, 9 Drawing Sheets

Generating a switching signal according to performances of the antenna system — S310

Switching a conduction from a first one of the branch units to a second one of the branch units according to the switching signal — S330

(58) Field of Classification Search
USPC .......... 455/132–135, 140, 191.1, 191.3, 275,
455/277.1–277.2
See application file for complete search history.

COMMUNICATION APPARATUS, ELECTRONIC APPARATUS AND ANTENNA ADJUSTMENT METHOD

CROSS-REFERENCE TO RELATED APPLICATION

This application claims the priority benefit of U.S. provisional application Ser. No. 62/651,693, filed on Apr. 2, 2018, and U.S. provisional application Ser. No. 62/768,098, filed on Nov. 16, 2018. The entirety of each of the above-mentioned patent applications is hereby incorporated by reference herein and made a part of this specification.

TECHNICAL FIELD

The disclosure relates to a multi-antennas technology, and more particularly, to a communication apparatus having multi-antennas, an electronic apparatus and an antenna adjustment method thereof.

BACKGROUND

With continuous evolution of wireless communication generation and upcoming fifth generation (5G) commercial services, there are more and more operating bands being used. To improve a transmission data rate in a users' network, multi-antennas have become an inevitable trend. However, the associated challenge that multi-antenna systems need to face is the problem of isolation. This problem represents a mutual interference between the multi-antennas, which may further affect overall radiation characteristic and system communication quality. Worse yet, severity of bad reception may lead to customer complaints, which may then cause damage to company's reputation.

The existing designs for the isolation of the antennas are still in lack of an adjustment mechanism and limited to a fixed single frequency operation.

In addition, as the user may travel in various environments with a mobile communication device, such as a notebook computer or a mobile phone, different environmental changes in different operating environments will, however, affect user online experience. Therefore, improvements are sill to be made for the existing multi-antennas systems.

SUMMARY

Accordingly, the disclosure provides a communication apparatus, an electronic apparatus and an antenna adjustment method, which are designed with the capability of dynamically switching between different branches in an antenna system of the communication apparatus at the right time to cope with the changes in the environment.

The communication apparatus according to the embodiments of the disclosure includes an antenna system, a tuning portion and a switch circuit. The antenna system includes at least two antenna units. The tuning portion is disposed between the at least two antenna units and includes at least two branch units. The switch circuit is coupled to the tuning portion. The switch circuit switches a conduction from a first one of the branch units to a second one of the branch units according to a switching signal. The switching signal is related to performance of the antenna system.

In an embodiment of the disclosure, the performance of the antenna system are evaluated in response to an execution period being expired.

An electronic apparatus according to the embodiments of the disclosure includes a communication apparatus, a wireless communication controller and a processing module. The communication apparatus includes an antenna system, a tuning portion and a switch circuit. The antenna system includes at least two antenna units. The tuning portion is disposed between the at least two antenna units and includes at least two branch units. The switch circuit is coupled to the tuning portion. The switching signal relates to performances of the antenna system. The wireless communication controller is coupled to the at least two antenna units of the antenna system. The processing module is coupled to the wireless communication controller and the switch circuit, and generates a switching signal according to performance of the antenna system. The switch circuit switches a conduction from a first one of the branch units to a second one of the branch units according to a switching signal.

In an embodiment of the disclosure, the branch units may have different lengths to satisfy multi-band operating requirements.

In an embodiment of the disclosure, the switch circuit includes one of a radio frequency (RF) switch or a switch diode.

In an embodiment of the disclosure, the branch units of the tuning portion are grounded through the switch circuit.

In an embodiment of the disclosure, the performance of the antenna system corresponding to the second one of the at least two branch units is higher than the performance of the antenna system corresponding to the first one of the at least two branch units.

In an embodiment of the disclosure, the processing module evaluates the performance of the antenna system in response to an execution period being expired.

In an embodiment, the processing module sequentially conducts one of the two branch units to obtain the performance of the antenna system corresponding to all of the branch units through the wireless communication controller.

In an embodiment of the disclosure, in response to the performance being higher than a threshold, the switch circuit keeps the conduction for the currently conducted branch unit.

An antenna adjustment method according to the embodiments of the disclosure is adapted to an antenna system having at least two antenna units. The antenna adjustment method includes the following steps. At least two branch units are provided, and the at least two branch units are disposed between the at least two antenna units. A switching signal is generated according to performance of the antenna system. A conduction is switched from a first one of the at least two branch units to a second one of the at least two branch units according to the switching signal.

In an embodiment of the disclosure, the performance of the antenna system includes one of isolation, radiation pattern and signal strength.

In an embodiment of the disclosure, the step in which the switching signal is generated according to the performance of the antenna system includes the following step of: evaluating the performance of the antenna system in response to an execution period being expired.

In an embodiment of the disclosure, before the step in which the switching signal is generated according to the performance of the antenna system, the method further includes the following step of: sequentially conducting one of the at least two branch units to obtain the performance of the antenna system corresponding to all of the at least two branch units.

In an embodiment of the disclosure, the method further includes the step of: in response to the performance being higher than a threshold, keeping the conduction for the currently conducted branch unit.

Based on the above, according to the communication apparatus, the electronic apparatus and the antenna adjustment method in the embodiments of the disclosure, the tuning portion is disposed between the antenna units of the antenna system, and the tuning portion includes two or more branch units. The embodiments of the disclosure, the conduction for the different branch units may be switched in time according to the performances (e.g., the signal strength, the isolation and the radiation pattern) of the antenna system so the conducted branch unit can optimize the overall system performance (e.g., the transmission data rate, throughput) in the current environment.

To make the above features and advantages of the disclosure more comprehensible, several embodiments accompanied with drawings are described in detail as follows.

DETAILED DESCRIPTION

Figure 1:
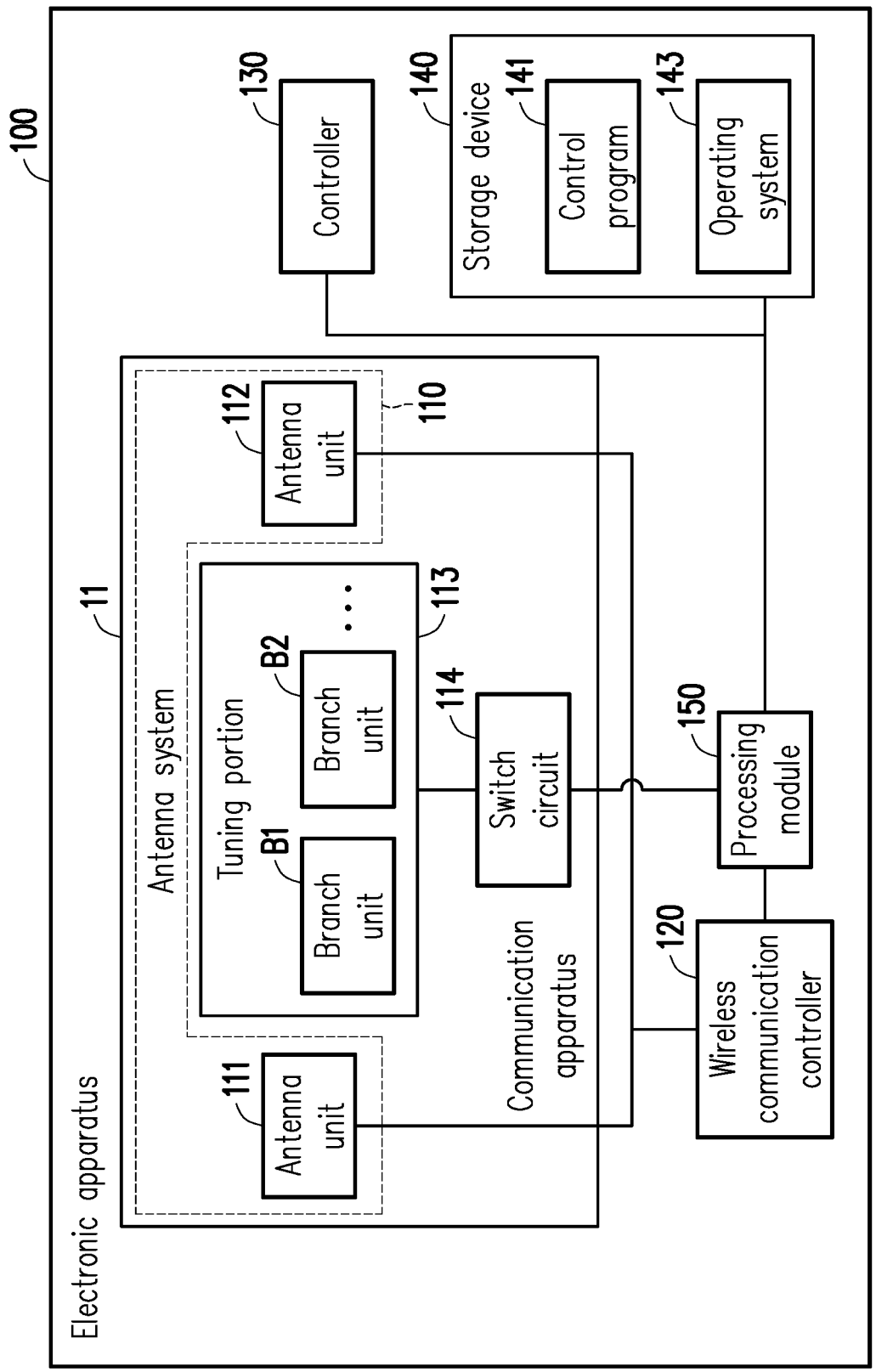
FIG. 1 is a block diagram illustrating elements in an electronic apparatus according to an embodiment of the disclosure.

FIG. 1 is a block diagram illustrating elements in an electronic apparatus 100 according to an embodiment of the disclosure. With reference to FIG. 1, the electronic apparatus 100 may be various devices including a notebook computer, a smart phone, a tablet computer, a handheld game console, etc. The electronic apparatus 100 can include, but not limited to, a communication apparatus 11, a wireless communication controller 120, a controller 130, a storage device 140 and a processing module 150.

The communication apparatus 11 includes an antenna system 110, a tuning portion 113 and a switch circuit 114. The antenna system 110 includes antenna units 111 and 112, and the antenna units 111 and 112 at least include a radiating body and a feeding point (not illustrated). It should be noted that, the embodiment of the disclosure does not limit the shape or the type of the antenna units 111 and 112, which may be designed to support any communication systems (e.g., Wireless Local Area Network (WLAN), Wireless Wide Area Network (WWAN) and the like) based on actual requirements. It should be noted that, the number of the antenna units 111 and 112 is not limited to two. In other embodiments, there may be even more antenna units in the antenna system 110.

The tuning portion 113 is disposed between the antenna units 111 and 112. The tuning portion 113 includes two or more branch units (e.g., branch units B1 and B2). The branch units B1 and B2 may have different lengths. In an embodiment, the length of the branch units B1 and B2 may substantially be a quarter of wavelengths corresponding to frequency bands supported by the antenna unit 111 and 112. For example, when the wavelength corresponding to the 2.4 GHz frequency band is approximately 125 mm, the length of the branch unit B1 is approximately 31.25 mm; when the wavelength corresponding to the 5 GHz frequency band is approximately 60 mm, the length of the branch unit B2 is approximately 15 mm. With the above configuration, the isolation between the antenna units 111 and 112, the radiation pattern, the received signal strength and the transmission speed/throughput of the communication apparatus 11 may be improved.

Figure 2A:
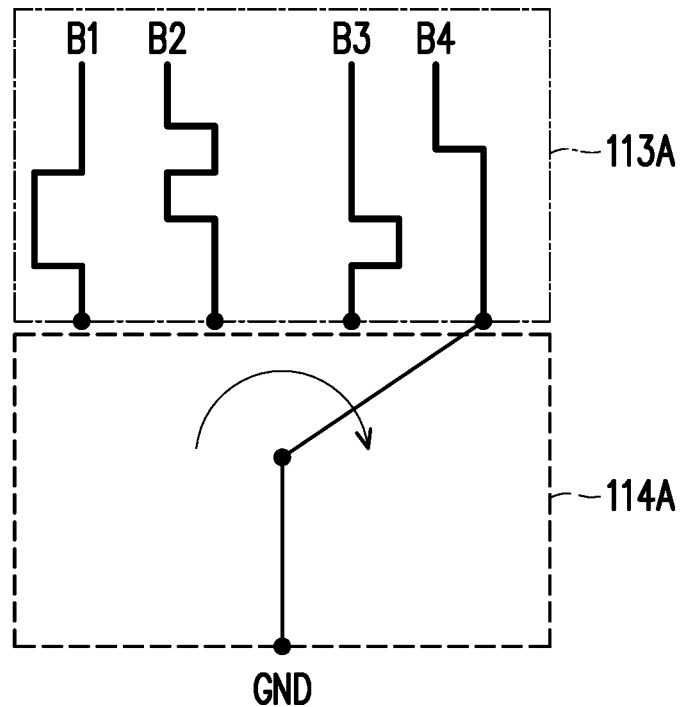
FIGS. 2A and 2B are schematic diagrams illustrating a tuning portion and a switch circuit according to an embodiment of the disclosure.
Figure 2B:
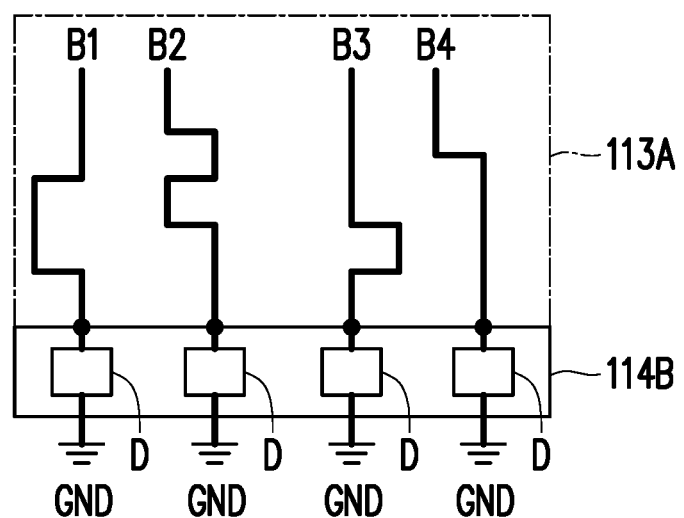

FIGS. 2A and 2B are schematic diagrams illustrating the tuning portion 113 and the switch circuit 114 according to an embodiment of the disclosure. With reference to FIG. 2A, in this embodiment, a tuning portion 113A includes four branch units B1, B2, B3 and B4, and each of the branch units B1 to B4 includes two open circuit ends (where one of the open circuit ends may be grounded after being selectively connected by a switch circuit 114A). A length of the branch unit B3 is, for example, a quarter of the wavelength corresponding to the 2.4 GHz frequency band; a length of the branch unit B4 is, for example, a quarter of the wavelength corresponding to the 3.5 GHz frequency band. On the other hand, with reference to FIG. 2B, based on different design requirements, each of the branch units B1 to B4 includes two open circuit ends (where one of the open circuit ends may be grounded after being selectively connected by a switch circuit 114B).

It should be noted that, the number, the shape and the type of the branch units B1 to B4 are not limited by the embodiments of FIGS. 2A and 2B, but may be modified by users based on actual requirements to be applied in various frequency bands or environments. Moreover, in certain embodiments, a part of the branch units B1 to B4 may be further disposed with a passive element. For the antenna system 110 having more than two antenna units, the branch units B1 and B2 in the tuning portion 113 may be disposed between any two adjacent antenna units.

The switch circuit 114 is coupled to the tuning portion 113. The switch circuit 114 may be one of a radio frequency switch (RF switch) or a switch diode. With reference to FIG. 2A in which the switch circuit 114A is the RF switch, the switch circuit 114A can selectively connect to the open circuit end of one of the branch units B1 to B4 (the switch circuit 114 is connected the branch unit B4, as shown by the drawing) so the connected branch unit B1, B2, B3 or B4 is conducted (i.e., the open circuit end is connected to the switch circuit 114A) and is grounded thereby (e.g., connected to a ground plane GND).

On the other hand, with reference to FIG. 2B, the switch circuit 114B is the switch diode including four grounded diodes D, which are connected to the branch units B1 to B4, respectively. After one of the diodes D is conducted, the correspondingly connected branch unit B1, B2, B3 or B4 may also be conducted and is grounded thereby.

The wireless communication controller 120 is coupled to the antenna units 111 and 112. The wireless communication controller 120 may be a wireless communication module, or a system in package (SiP). In this embodiment, the wireless communication controller 120 may be integrated with circuits like an amplifier, a digital to analog converter, a mixer and the like to generate a RF signal and send or receive the RF signal through the antenna units 111 and 112 so as to communicate with an access point (AP), a base station or other devices.

The controller 130 may be related control circuits like a basic input output system (BIOS) or an embedded controller (EC). In this embodiment, the controller 130 is configured to establish a conduction for each of the branch units B1 and B2 in the tuning portion 113. For example, the conduction is determined according to settings of logic gates; or the conduction is determined according to high or low level voltages.

The storage 140 may be storage devices including a traditional hard disk (HDD), a solid state drive (SSD), or other similar elements. In this embodiment, the storage device 140 includes an application (e.g., a control program 141 and the like), an operating system (OS) 143, data or files like a performance parameter or a threshold, and details regarding the same will be described later in the subsequent embodiment.

The processing module 150 is coupled to the communication apparatus 11, the wireless communication controller 120, the controller 130 and the storage device 140. The processing module 150 may be a central processing unit (CPU), a system on chip (SoC), a chip set or other similar elements. In this embodiment of the disclosure, the processing module 150 may load in and execute the control program 141, the operating system 143, the files and the data recorded by the storage device 140. The processing module 150 includes a driver program of the wireless communication controller 120, and can connect with the wireless communication controller 120 through transmission interfaces of peripheral component interconnect express (PCIE), connectivity integrated (CNVi), universal serial bus (USB) and the like. In addition, the processing module 150 can connect to the switch circuit 114 through a general purpose input output (GPIO) interface or other signal transmission interfaces, so as to control operations of the switch circuit 114 (e.g., sending a switching signal to conduct the branch unit B1 or B2).

It should be noted that, in certain embodiments, functions of the controller 130 and the processing module 150 may be integrated into one single chip or circuit.

For better understanding of operating procedures in the embodiments of the disclosure, various embodiments are provided below and served to describe the operating procedures of the electronic apparatus 100 in the embodiments of the disclosure. In the following paragraphs, the method according to the embodiments of the disclosure is described below with reference to various modules, devices and elements in the electronic apparatus 100. Each step in this method may be adjusted based on the actual implementation, and the disclosure is not limited thereto.

Figure 3:
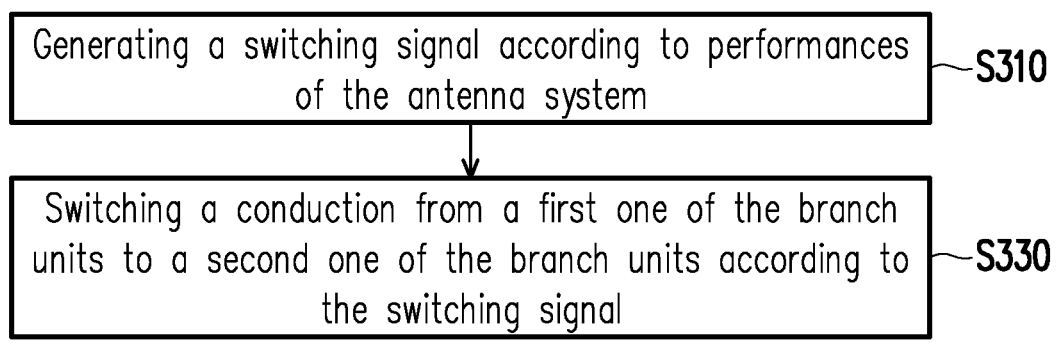
FIG. 3 is a flowchart of an antenna adjustment method according to an embodiment of the disclosure.

FIG. 3 is a flowchart of an antenna adjustment method according to an embodiment of the disclosure. With reference to FIG. 3, the processing module 150 generates a switching signal according to performance of the antenna system 110 (step S310). Specifically, in order to cope with the changes in the environment and the supported frequency band, the embodiment of the disclosure provides two or more branch units B1 and B2 (i.e., multiple options) and a performance evaluation task may be triggered for the current antenna system 110 to select the suitable one of the branch unit B1 or B2 so the performance of the antenna system can be optimized to adapt the current environment or operating frequency band. The performance evaluation task may be automatically triggered by the processing module 150 in response to an execution period (e.g., 10 seconds, 30 seconds, 1 minute) being expired, the control program 141 being executed or the operating system 143 being started. The performance evaluation task may be manually triggered in response to operations (e.g., pressing, clicking, triggering, and the like) of the user on an input device (e.g., a key, a button, a switch, and the like).

In an embodiment, the processing module 150 can sequentially conduct one of the branch units B1 and B2, so as to obtain the performances of the antenna system 110 corresponding to all the branch units B1 and B2 through the wireless communication controller 120. For example, when only the branch unit B1 is conducted, the processing module 150 obtains the current performance of the antenna system 110. Then, the switch circuit 114 conducts only the branch unit B2 and the processing module 150 obtains the current performance the antenna system 110. Accordingly, the performances of the antenna system 110 corresponding to the two branch units B1 and B2 may then be obtained. The processing module 150 can compare the performances of the antenna system 110 corresponding to the branch units B1 and B2 (through a sorting algorithm, including bubble sort, selection sort, insertion sort, shell sort, merge sort, quick sort, heap sort, radix sort, etc.), and select one of the branch units B1 and B2 corresponding to the optimal performance. If the currently conducted branch unit B1 or B2 is selected, it means that the performance can be optimized by keeping the conduction for the current branch unit B1 or B2, and thus the processing module 150 does not generate the switching signal. If the currently conducted branch unit B1 or B2 is not selected, it means that the performance cannot be optimized by keeping the conduction for the current branch unit B1 or B2, and thus the processing module 150 generates the switching signal corresponding to the selected branch unit B1 or B2. This switching signal relates to the conduction for the selected branch unit B1 or B2 and a non-conduction for the currently conducted branch unit B1 or B2.

In another embodiment, the processing unit 150 may first determine whether the performance of the antenna system 110 corresponding to the currently conducted branch unit B1 or B2 is greater than a specific threshold. For example, whether a received signal strength indicator (RSSI) measured by the wireless communication controller 120 is greater than −60 dBm may be determined. If the performance of the antenna system 110 corresponding to the currently conducted branch unit B1 or B2 is greater than the threshold, the processing module 150 does not generate the switching signal so that the conduction is kept for the currently conducted branch unit B1 or B2 without determining or comparing the performance corresponding the non-conducted branch unit B1 or B2. On the other hand, if the performance corresponding to the currently conducted branch unit B1 or B2 is not greater than the threshold, the processing module 150 determines and compares the performance corresponding to the non-conducted branch unit B1 or B2 and then determines whether to generate the switching signal.

In an embodiment, from the wireless communication controller 120, the processing module 150 can obtain the performances of the antenna system 110 including the isolation, the signal strength, the radiation pattern and the like, so as to evaluate the current environment. For example, the wireless communication controller 120 can measure the RSSI as a reference for the processing module 150 to evaluate the current environment. It should be noted that, based on experimental data, higher signal strength can effectively increase the throughput, thereby improving users' internet experience. In another embodiment, the processing module 150 may also execute a throughput test through the control program 141 and obtains the throughput corresponding to all the branch units B1 and B2.

Next, in response to the switching signal being generated, the processing module 150 can switch a conduction from a first one of the branch units B1 and B2 (i.e., the currently conducted branch unit) to a second one of the branch units B1 and B2 (i.e., the branch unit corresponding to the switching signal) (step S330). In other words, the performance corresponding to the second one of the at least two branch units B1 and B2 is higher than the performance corresponding to the first one of the at least two branch units B1 and B2, and the conduction for the second one of the at least two branch units B1 and B2 is more suitable for the current environment. The controller 130 can establish the settings of the logic gates or the voltage levels for the corresponding branch unit B1 or B2 according to the switching signal, so as to control the switch circuit 114 to conduct only the branch unit B1 or B2 corresponding to the switching signal. Then, the conduction for the branch unit B1 or B2 corresponding to the switching signal will be kept for a period of time. Meanwhile, the performance evaluation task may be triggered regularly (e.g., when the execution period expired) or irregularly so the processing module 150 can determine whether to switch between the branch units B1 and B2 again. It should be noted that, the behavior regarding the different branch unit B1 or B2 being conducted in the performance evaluation task may also be performed based on the switching signal.

Figure 4:
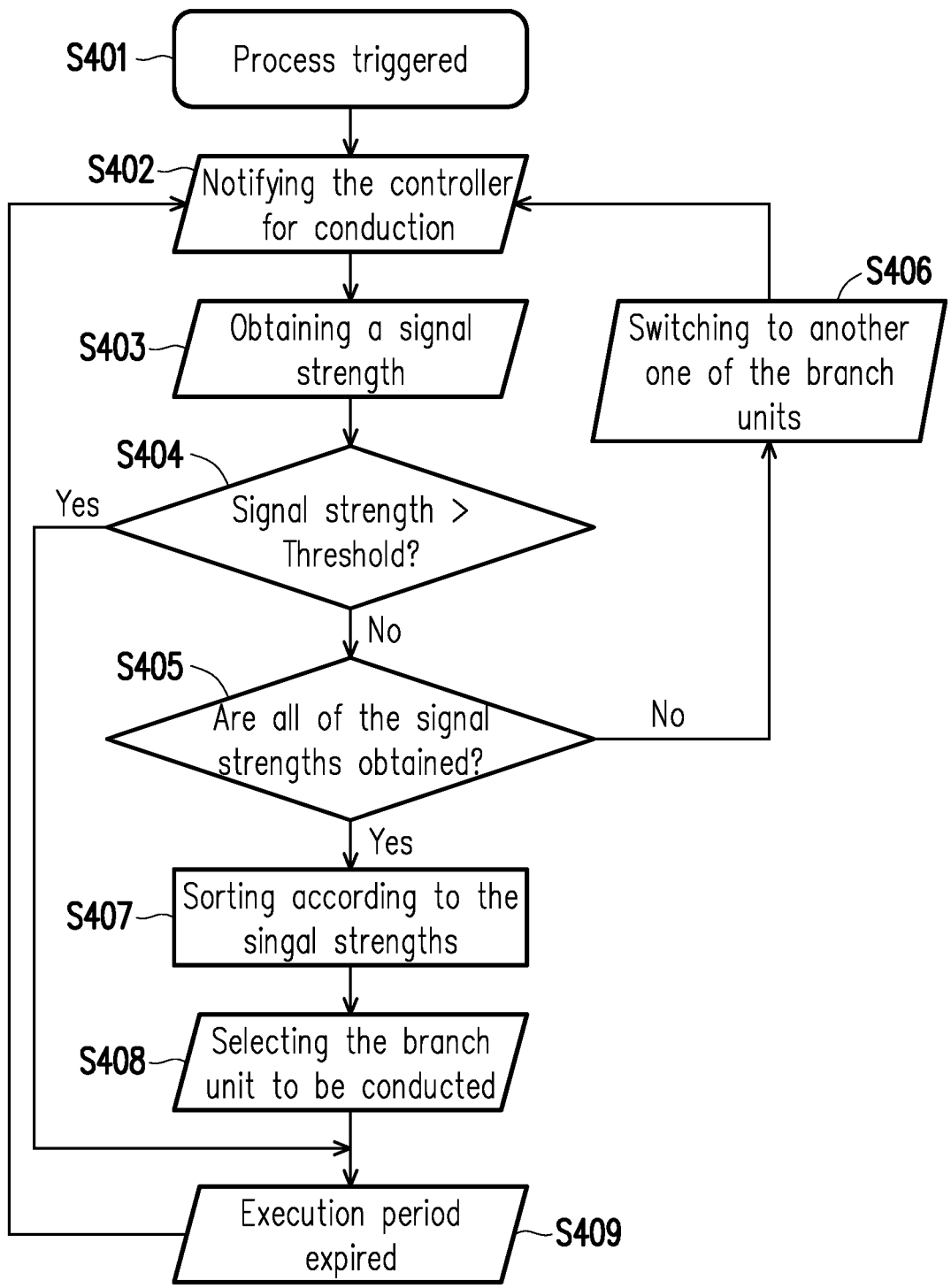
FIG. 4 is a flowchart of an antenna adjustment method based on signal strength according to an embodiment of the disclosure.

In order to assist the reader in understanding the spirit of the embodiments of the disclosure, an application scenario is provided below as an example in the description. FIG. 4 is a flowchart of an antenna adjustment method based on a signal strength according to an embodiment of the disclosure. With reference to FIG. 4, the signal strength is used as a reference for evaluating the performances in this embodiment, and the tuning portion 113A and the switch circuit 114A in FIG. 2A are used as examples in the description. This process may be triggered by the control program 141 being executed or a manual operation of the user (step S401). The control program 141 can notify the controller 130 to establish the corresponding logic gates for controlling the switch circuit 114A through an application programming interface (API) of windows management instrumentation (WMI), so as to connect the branch unit B1, B2, B3 or B4 for conduction (step S402). For example, the branch unit B1 corresponds to "00"; the branch unit B2 corresponds to "01"; the branch unit B3 corresponds to "10"; the branch unit B4 corresponds to "11". It is assumed that the branch unit B1 has already been conducted, or the branch unit B1 is default conducted. The control program 141 sends a command for obtaining the current RSSI through the processing module 150 (step S403), and determines whether the RSSI is greater than a threshold (e.g., −50, −60 or −70 dBm) (step S404). If the RSSI is greater than the threshold, the processing module 150 keeps the conduction for the current conducted branch unit B1 without generating the switching signal. If the RSSI is not greater than the threshold, the processing module 150 will evaluate the RSSIs of the other branch units B2 to B4

The control program 141 is used to determine whether the RSSIs corresponding to the branch units B1 to B4 have been all obtained (step S405). If the RSSIs corresponding to the branch units B1 to B4 are not all obtained, the processing module 150 switches to another one of the branch units B2 to B4 with the RSSI not been obtained yet (step S406), and conducts only the selected branch unit (B2 to B4) until the RSSIs of the branch units B1 to B4 are all obtained. Next, the control program 141 sorts the branch units B1 to B4 according to the RSSIs through the sorting algorithm (step S407), and selects the corresponding branch unit (which is assumed to be the branch unit B4) having the highest RSSI as the branch unit to be conducted, generating the corresponding switching signal accordingly, and sets the corresponding logic gates (step S408). Next, when the execution period is expired (step S409), whether the currently conducted branch unit B4 is to be switched will be re-evaluated.

It should be noted that, there may be some conditions to be changed for generating the switching signal. For example, the switching signal may be generated once the performance corresponding to the currently conducted branch unit is less than an average of the performances corresponding to all the branch units. Alternatively, the switching signal may be generated once the performance corresponding to currently conducted branch units B1, B2, B3 or B4 is lower than the performance corresponding the next one of the branch units B1, B2, B3 or B4 being evaluated. Other changes may be adjusted based on requirements of the users, and are not particularly limited by the embodiments of the disclosure.

Figure 5:
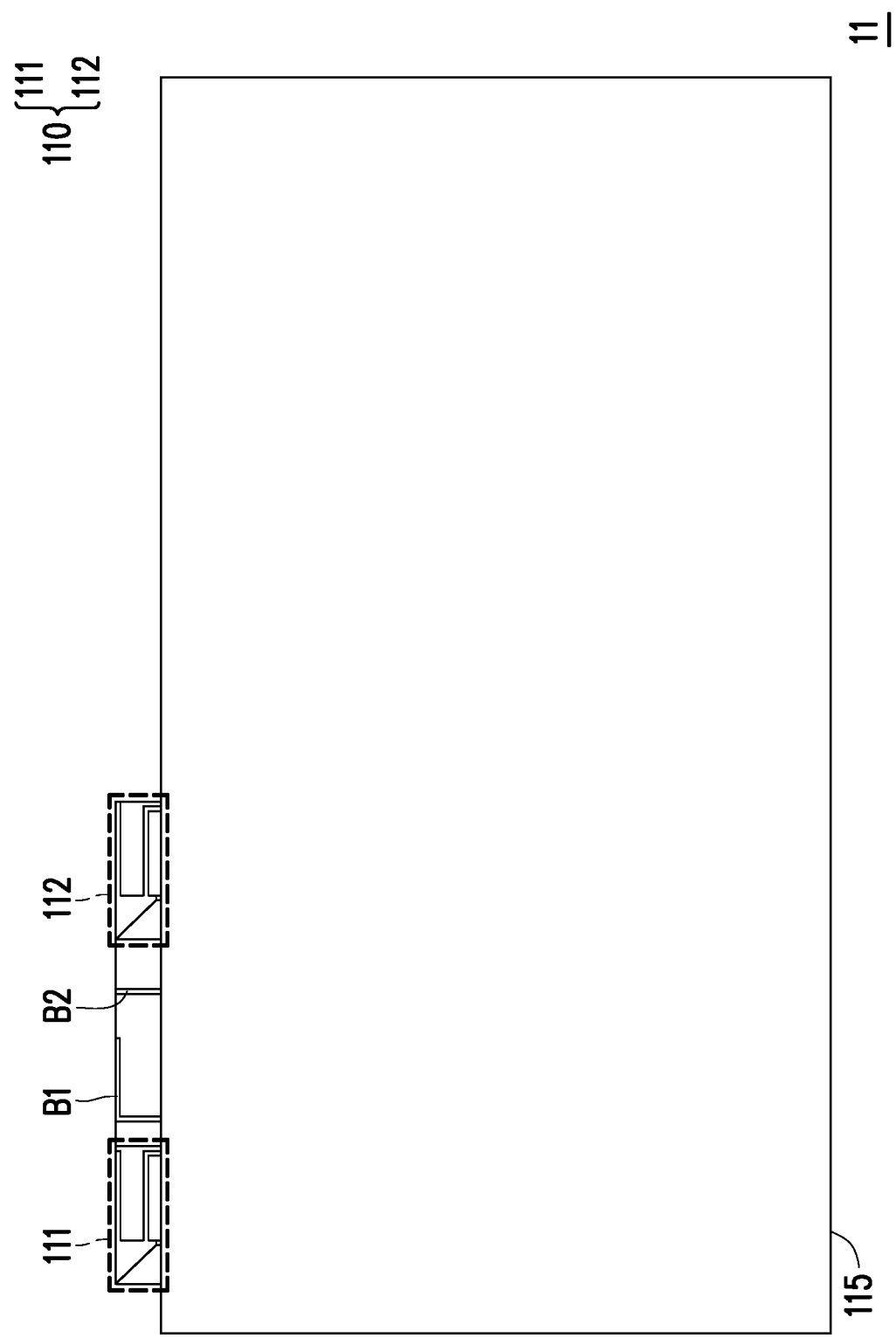
FIG. 5 is a schematic diagram illustrating a communication apparatus according to an embodiment of the disclosure.
Figure 6A:
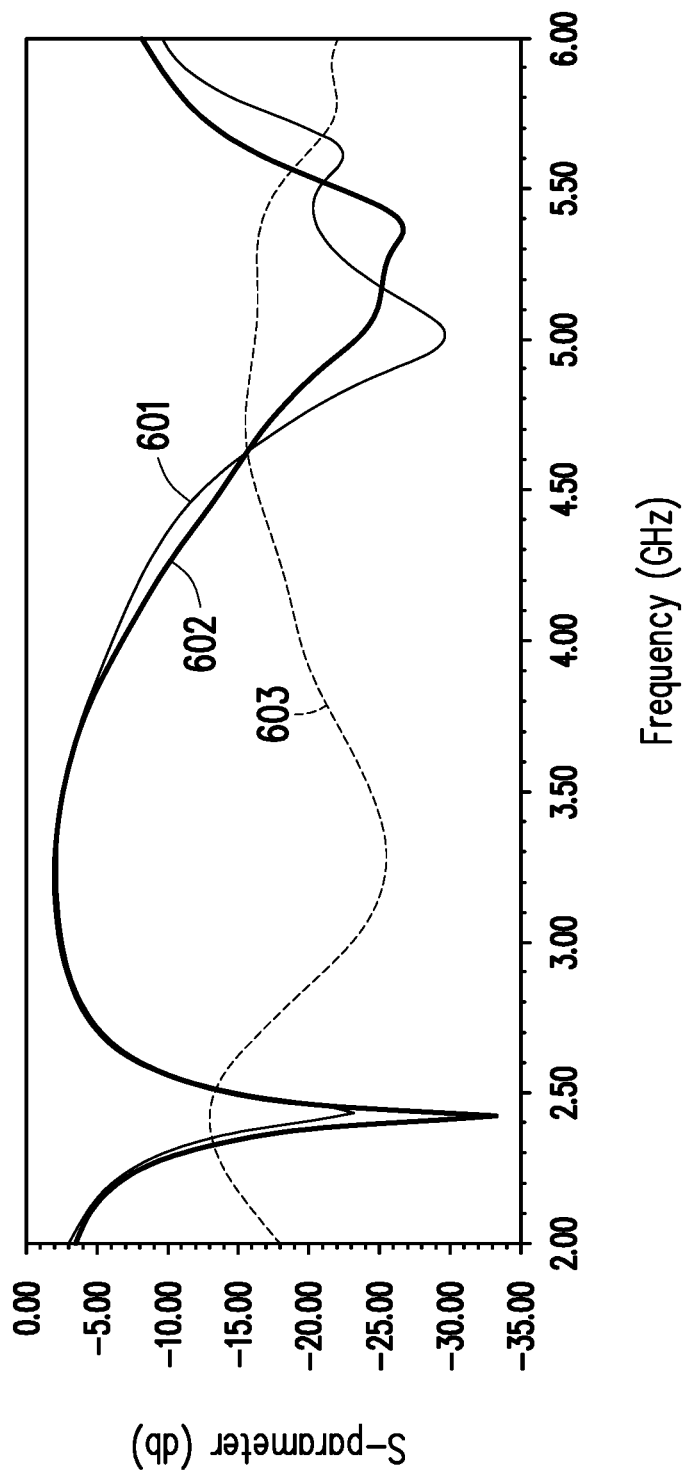
FIGS. 6A to 6C are S-parameter charts of FIG. 5.
Figure 6B:
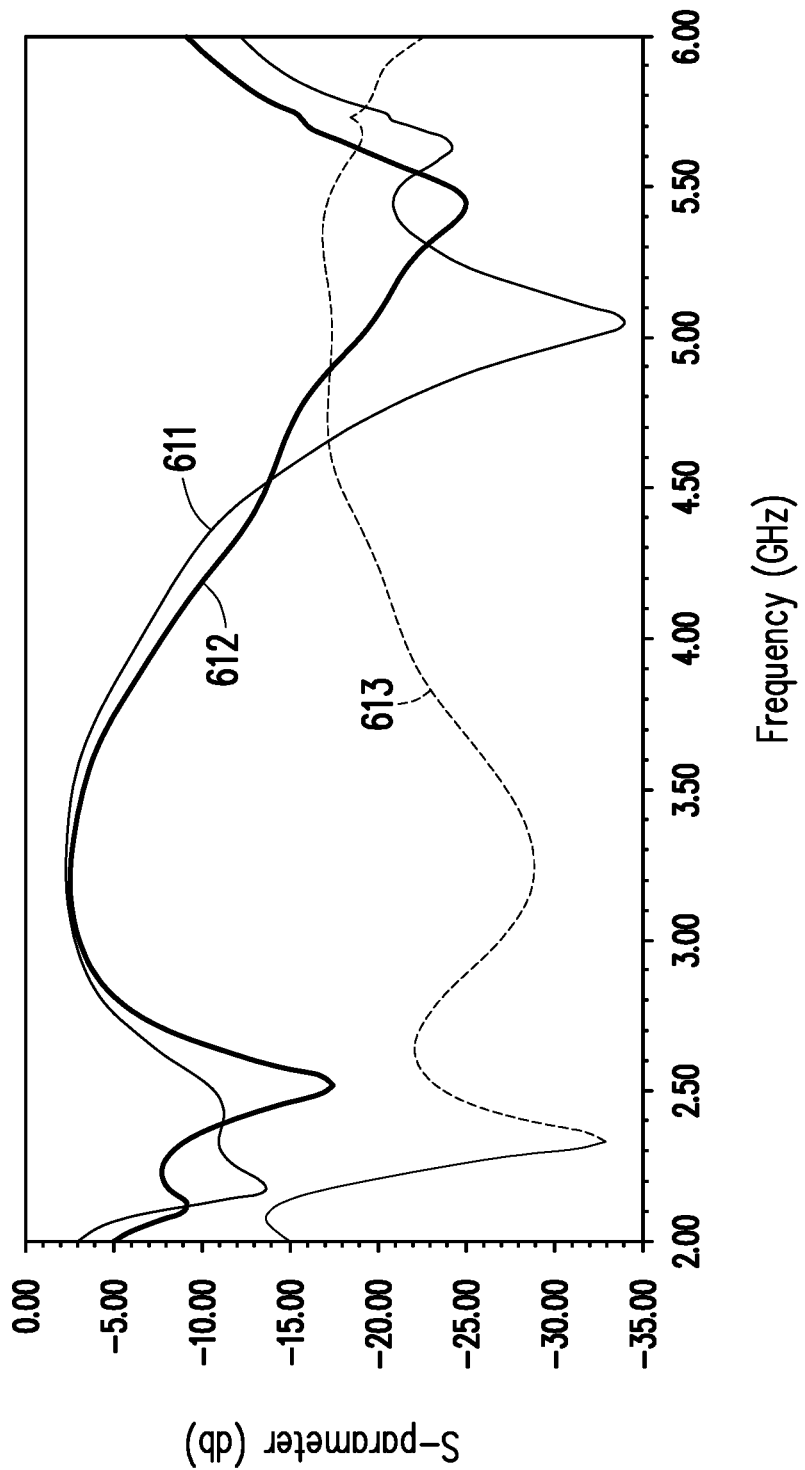
Figure 6C:
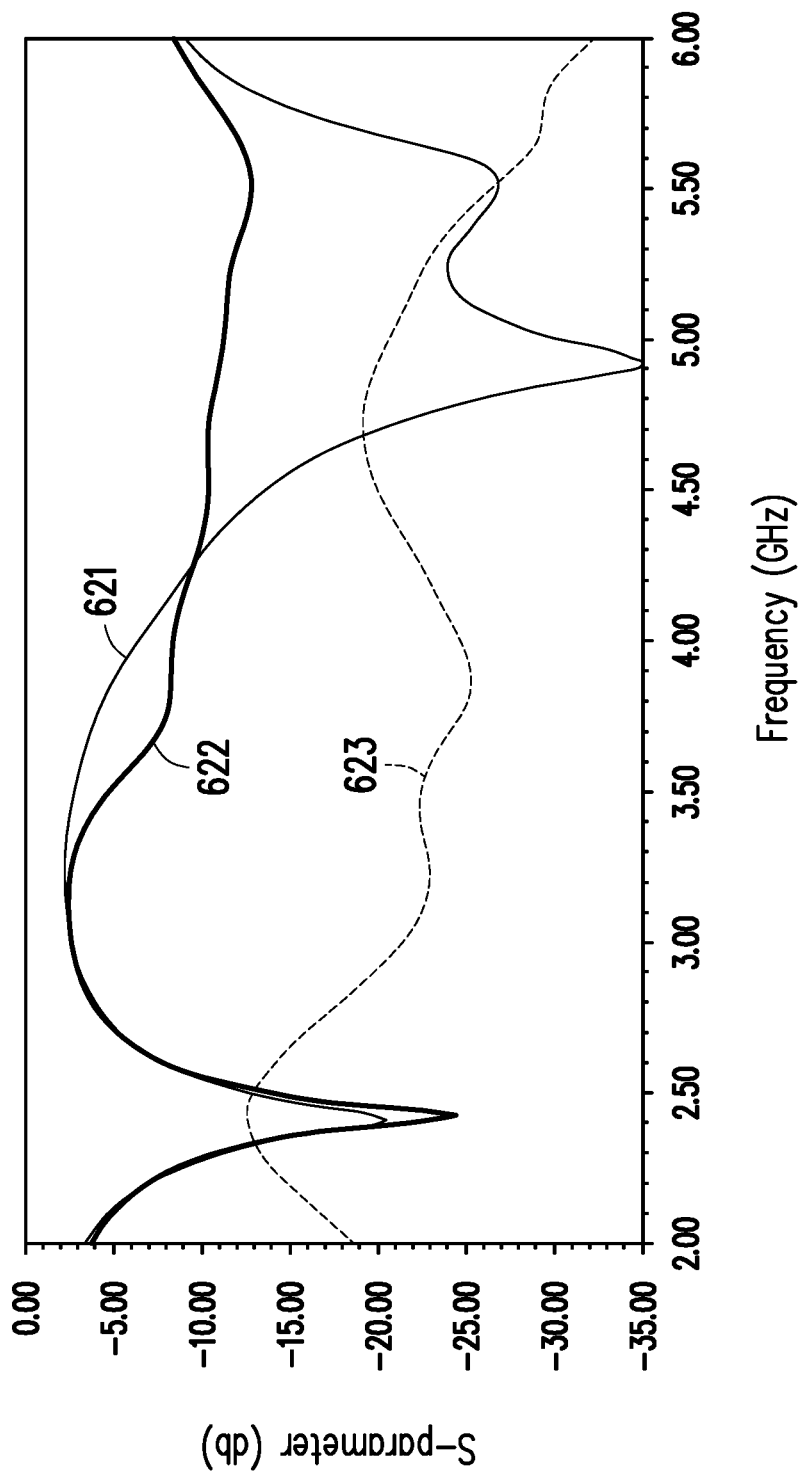

Regarding to the effectiveness of the embodiment of the disclosure, FIG. 5 is a schematic diagram illustrating a communication apparatus 11 according to an embodiment of the disclosure. With reference to FIG. 5, the two branch units B1 and B2 are disposed between the antenna units 111 and 112. It should be noted that, the switch circuit 114 is further disposed between the branch units B1 and B2 and a ground plane 115. FIGS. 6A to 6C are S-parameter charts of FIG. 5. With reference to FIG. 6A, when the switch circuit 114 does not conduct the two branch units B1 and B2 in a simulated environment, reflection coefficients corresponding to the antenna units 111 and 112 are shown by curves 601 and 602, respectively, and the isolation between the antenna units 111 and 112 is shown by a curve 603.

With reference to FIG. 6B, it is assumed that the current operating frequency band is 2.4 GHz and the length of the branch unit B1 is approximately a quarter of the wavelength corresponding to 2.4 GHz. As the switch circuit 114 conducts only the branch unit B1 and the branch unit B1 is grounded thereby, the reflection coefficients corresponding to the antenna units 111 and 112 are shown by curves 611 and 612, respectively, and the isolation between the antenna units 111 and 112 is shown by a curve 613. As compared to FIG. 6A, the corresponding isolation and the performance of the two antenna units 111 and 112 are improved at 2.4 GHz in FIG. 6B.

With reference to FIG. 6C, it is assumed that the current operating frequency band is 5 GHz and the length of the branch unit B2 is approximately a quarter of the wavelength corresponding to 5 GHz. As the switch circuit 114 conducts only the branch unit B2 and the branch unit B2 is grounded thereby, the reflection coefficients corresponding to the antenna units 111 and 112 are shown by curves 621 and 622, respectively, and the isolation between the antenna units 111 and 112 is shown by a curve 623. As compared to FIG. 6A, the isolation and the performances of the two antenna units 111 and 112 are improved at 5 GHz in FIG. 6C.

Figure 7:
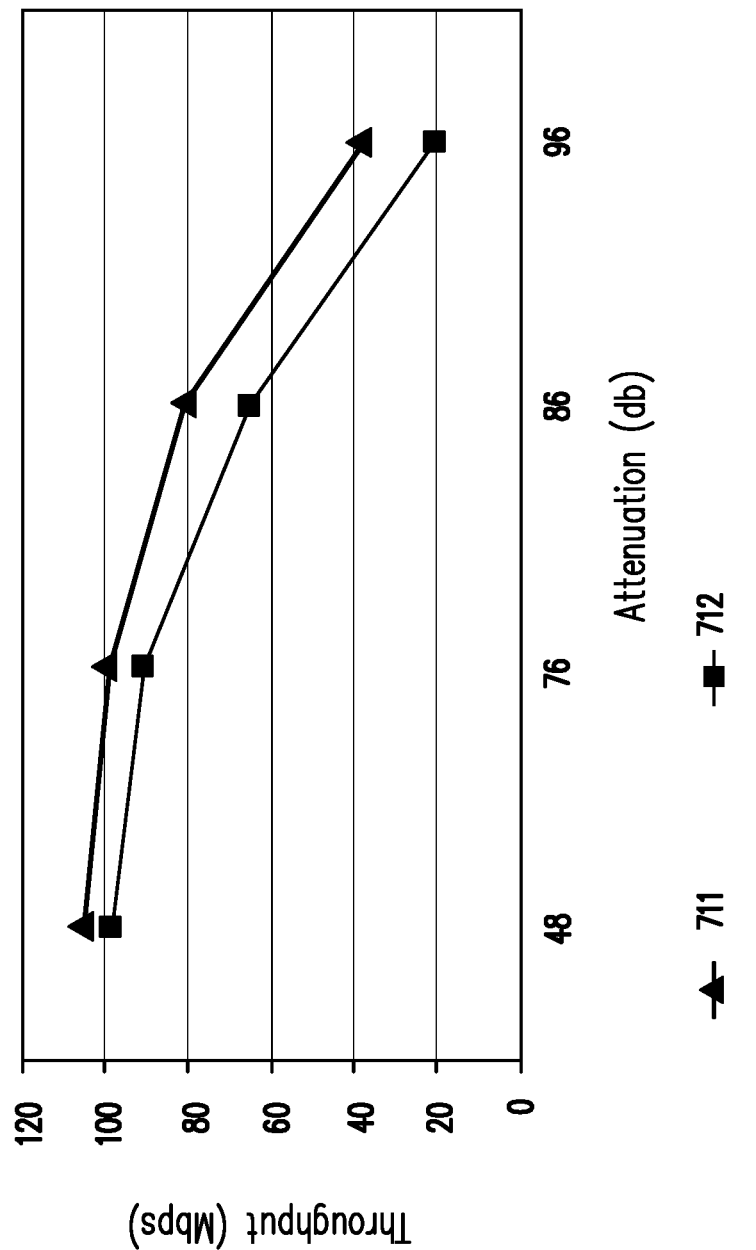
FIG. 7 is a measurement chart for throughput according to an embodiment of the disclosure.

FIG. 7 is a measured result for a throughput according to an embodiment of the disclosure. With reference to FIG. 7, it shows the experimentally-measured throughput with different attenuations. It should be noted that the throughputs are corresponding to the different distances between the electronic apparatus 100 of the user and the access point (AP). Here, a curve 711 is the measured throughput when the isolation between the two antenna units 111 and 112 is 20 dB and the received signal strength (RSSI) is −55 dBm; a curve 712 is the measured throughput when the isolation between the two antenna units 111 and 112 is 14 dB and the received signal strength (RSSI) is −70 dBm. After comparing the curve 711 with the curve 712, it can be known that better performance (e.g., the isolation and the received signal strength) lead the electronic apparatus 100 to have better throughput, which is especially obvious with high attenuation (i.e., with a longer operating distance). Therefore, it can be verified that, by adjusting settings for the antenna system 110 to have the improved performance as used in the embodiments of the disclosure, throughput may be further improved.

In summary, according to the communication apparatus, the electronic apparatus and the antenna adjustment method in the embodiments of the disclosure, more than two branch units are disposed between the antenna units of the antenna system. These lengths of the branch units are designed for improving the isolation corresponding to specific frequency bands of the antenna units. So it can be applied with changing environment and different frequency band, the communication apparatus can switch on different branch units to provide an adjustment configuration that is better for applying to current environment or frequency band. As a result, not only a flexible adjustment method is provided, but also effectively increase the throughput for the optimized system, and thereby improving users' internet experience.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A communication apparatus, comprising:
    an antenna system, having at least two antenna units;
    a tuning portion, disposed between the at least two antenna units to provide isolation between the at least two antenna units, and comprising at least two branch units; and
    a switch circuit, coupled between a ground plane and each of the at least two branch units, and dynamically switching between a first one of the at least two branch units conducting to the ground plane and a second one of the at least two branch units conducting to the ground plane according to a switching signal to dynamically adjust the isolation between the at least two antenna units, wherein the switching signal is related to performance of the antenna system.

2. The communication apparatus according to claim 1, wherein the switch circuit comprises one of a radio frequency (RF) switch or a switch diode.

3. The communication apparatus according to claim 1, wherein the branch units of the tuning portion are grounded through the switch circuit.

4. The communication apparatus according to claim 1, wherein the performance of the antenna system corresponding to the second one of the at least two branch units is higher than the performance of the antenna system corresponding to the first one of the at least two branch units.

5. The communication apparatus according to claim 4, wherein the performance of the antenna system comprise one of isolation, radiation pattern and signal strength.

6. The communication apparatus according to claim 1, wherein the performance of the antenna system are evaluated in response to an execution period being expired.

7. An electronic apparatus, comprising:
    a communication apparatus, comprising:
        an antenna system, having at least two antenna units;
        a tuning portion, disposed between the at least two antenna units to provide isolation between the at least two antenna units and comprising
        at least two branch units; and
        a switch circuit, coupled between a ground plane and each of the at least two branch units, and dynamically switching between a first one of the at least two branch units conducting to the ground plane and a second one of the at least two branch units conducting to the ground plane according to a switching signal to dynamically adjust the isolation between the at least two antenna units;
    a wireless communication controller, coupled to the at least two antenna units of the antenna system; and
    a processing module, coupled to the wireless communication controller and the switch circuit, and generating the switching signal according to performance of the antenna system, wherein
        the switch circuit switches a conduction from a first one of the at least two branch units to a second one of the at least two branch units according to the switching signal.

8. The electronic apparatus according to claim 7, wherein the switch circuit comprises one of a RF switch or a switch diode.

9. The electronic apparatus according to claim 7, wherein the branch units of the tuning portion are grounded through the switch circuit.

10. The electronic apparatus according to claim 7, wherein the performance of the antenna system corresponding to the second one of the at least two branch units is higher than the performance of the antenna system corresponding to the first one of the at least two branch units.

11. The electronic apparatus according to claim 10, wherein the performance of the antenna system comprise one of isolation, radiation pattern and signal strength.

12. The electronic apparatus according to claim 7, wherein the processing module evaluates the performance of the antenna system in response to an execution period being expired.

13. The electronic apparatus according to claim 7, wherein the processing module sequentially conducts one of the at least two branch units to obtain the performance of the antenna system corresponding to all of the at least two branch units through the wireless communication controller.

14. The electronic apparatus according to claim 7, wherein in response to the performance being higher than a threshold, the switch circuit keeps the conduction for the currently conducted branch unit.

15. An antenna adjustment method, adapted to an antenna system having at least two antenna units, the antenna adjustment method comprising:
    providing at least two branch units, wherein the at least two branch units are disposed between the at least two antenna units to provide isolation between the at least two antenna units;
    generating a switching signal according to performance of the antenna system; and
    dynamically switching between a first one of the at least two branch units conducting to the ground plane and a second one of the at least two branch units conducting to the ground plane according to the switching signal to dynamically adjust the isolation between the at least two antenna units.

16. The antenna adjustment method according to claim 15, wherein the performance of the antenna system comprise one of isolation, radiation pattern and signal strength.

17. The antenna adjustment method according to claim 15, wherein the step of generating the switching signal according to the performance of the antenna system comprises:
  evaluating the performances of the antenna system in response to an execution period being expired.

18. The antenna adjustment method according to claim 15, wherein before the step of generating the switching signal according to the performance of the antenna system, the antenna adjustment method further comprises:
  sequentially conducting one of the at least two branch units to obtain the performance of the antenna system corresponding to all the at least two branch units.

19. The antenna adjustment method according to claim 15, further comprising:
  response to the performance being higher than a threshold, keeping the conduction for the currently conducted branch unit.

* * * * *